J. C. STINSON.
MONUMENT.
No. 171,881. Patented Jan. 4, 1876.
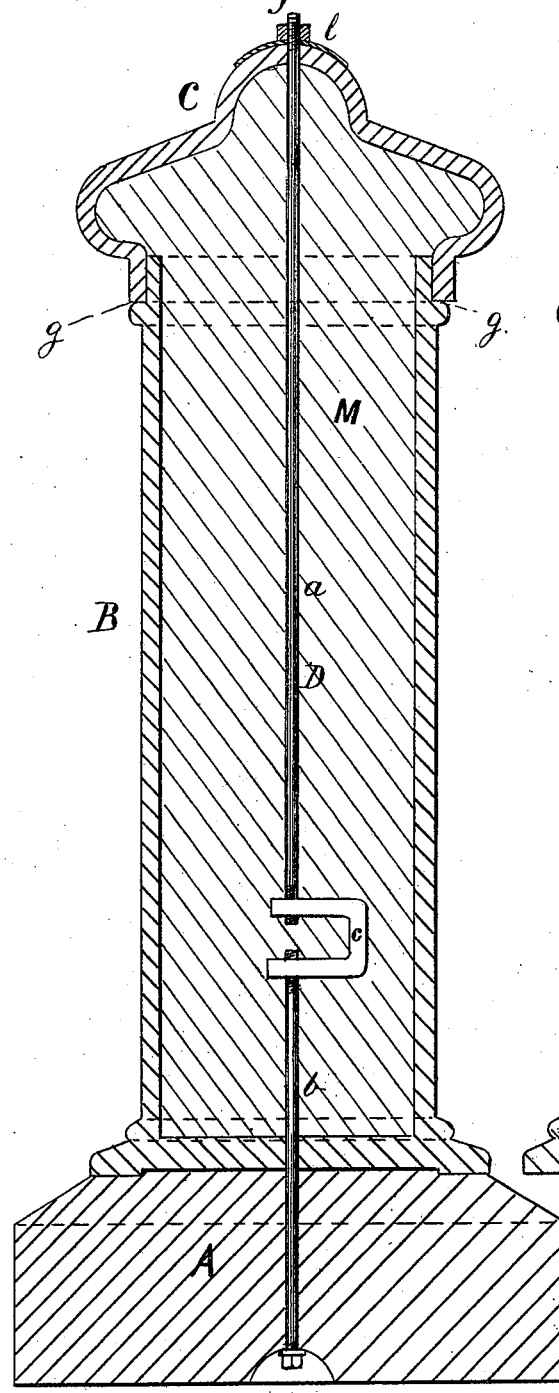
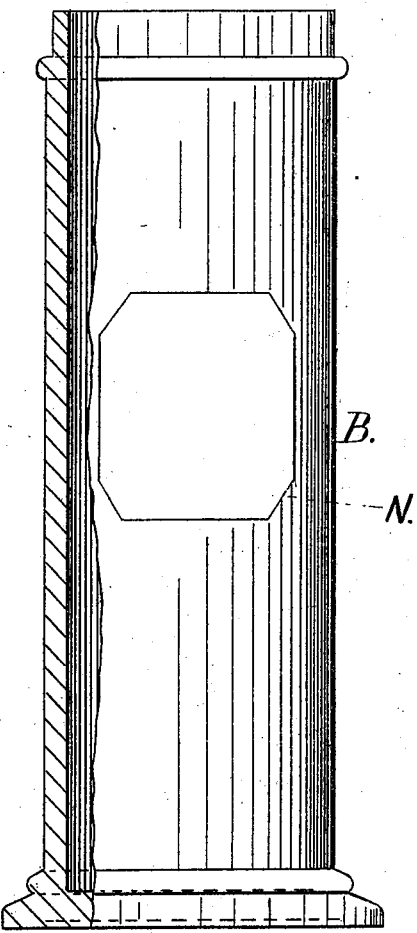

UNITED STATES PATENT OFFICE.

JAMES C. STINSON, OF MEMPHIS, TENNESSEE.

IMPROVEMENT IN MONUMENTS.

Specification forming part of Letters Patent No. 171,881, dated January 4, 1876; application filed October 2, 1875.

*To all whom it may concern:*

Be it known that I, J. C. STINSON, of the city of Memphis, in the county of Shelby and State of Tennessee, have invented certain new and useful Improvements in Monuments; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates to monumental architecture; and the nature thereof consists in certain new and ornamental constructions, to be hereinafter more fully described by the aid of the accompanying drawings and letters of reference marked thereon, in which—

Figure 1 is a sectional elevation. Fig. 2 is a sectional elevation of column.

To enable those skilled in the art to make and use my invention, I will proceed to describe it.

To construct my monument I take a stone base, A, upon which I erect a hollow column of pressed or blown glass, which column, being open at the top, is covered in by a glass cap, C. This cap is so constructed that when placed upon the top of the monument it forms a water-proof joint, as is shown at $g$, and is fastened down by the brass rod D, which passes directly through the center of the monument from bottom of base to top of cap, and is fastened at the top by means of the plate $l$, and on this plate is fastened, by means of the said rod, an ornamental dove or other suitable design, as is desired. This rod is in two pieces, $a$ and $b$, and is connected by a spring, $c$, so that it is adapted to the expansion or contraction of the glass occasioned by heat or cold. The inscription N is made on glass or metallic plate, or may be painted on the inside of the glass. When made on metal, as is shown in the drawings, it is placed in the inside of the glass column, and can be easily read through the glass.

The glass column can be painted of any desired color on the inside, and filled with dry sand M; or the painting and filling may be omitted, leaving the glass transparent as a reservoir for flowers, photographs, or any other desired ornament.

What I claim, and desire to secure by Letters Patent of the United States, is—

1. In a hollow glass tombstone, the combination of the base A, column B, top C, and rod D, composed of the sections $a\ b$, and connected by the spring $c$, substantially as and for the purpose set forth.

2. A hollow glass tombstone filled with sand or similar material, and consisting of the base A, column B, top C, and rod D, composed of sections $a\ b$, connected together, and provided with means for allowing expansion, substantially as and for the purpose set forth.

In testimony that I claim the foregoing as my own I affix my signature in presence of two witnesses.

JAMES CYRUS STINSON.

Witnesses:
   JNO. D. PATTEN,
   YVAN PIKE.